United States Patent
Cannon et al.

(10) Patent No.: US 6,615,225 B1
(45) Date of Patent: Sep. 2, 2003

(54) SYSTEM AND METHOD FOR RELATING FILES IN A DISTRIBUTED DATA STORAGE ENVIRONMENT

(75) Inventors: David M. Cannon, Tucson, AZ (US); Colin S. Dawson, Tucson, AZ (US); Mark A. Haye, Tucson, AZ (US); James P. Smith, Menlo Park, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/561,252

(22) Filed: Apr. 27, 2000

(51) Int. Cl.[7] .............................................. G06F 17/30
(52) U.S. Cl. .................. 707/204; 707/202; 707/10; 715/511
(58) Field of Search ................ 707/1, 10, 203, 707/204, 100, 101, 8, 202; 709/246, 236, 217, 224; 711/112, 115; 700/181; 379/114.14; 705/2; 714/47; 345/716, 723, 502; 370/426; 717/172; 715/511

(56) References Cited

U.S. PATENT DOCUMENTS

| | | | |
|---|---|---|---|
| 5,086,402 A | 2/1992 | Sterling, II | 709/246 |
| 5,263,154 A | 11/1993 | Eastridge et al. | 714/6 |
| 5,446,888 A | 8/1995 | Pyne | 707/10 |
| 5,574,906 A | 11/1996 | Morris | 707/1 |
| 5,659,614 A | 8/1997 | Bailey, III | 713/165 |
| 5,673,382 A | 9/1997 | Cannon et al. | 714/6 |
| 5,721,907 A | 2/1998 | Pyne | 707/10 |
| 5,765,173 A | 6/1998 | Cane et al. | 707/204 |
| 5,778,395 A * | 7/1998 | Whiting et al. | 707/204 |
| 5,978,805 A | 11/1999 | Carson | 707/10 |
| 6,145,012 A * | 11/2000 | Small | 709/246 |

FOREIGN PATENT DOCUMENTS

EP  1049988 B1 * 9/2002 ........... G06F/12/00

* cited by examiner

Primary Examiner—Kim Vu
(74) Attorney, Agent, or Firm—Kunzler & Associates (57) ABSTRACT

A system and method for relating files in a distributed data storage environment allows for positive identification of membership of a file within a group, even in a loosely coupled environment where files are not available for comparison in real time. In disclosed embodiments, base files of a client are stored on a server and are accompanied by tokens uniquely identifying the base files. The tokens are generated on the client and may be derived from the contents of the base file using a digital signature. Each file transmitted to the server is accompanied with a token. Incremental backups may be used, and may employ file differencing. Accordingly, sub-files related to the base files may be transmitted to the server for backup. The sub-files are related to their respective base files using the tokens and are cross-linked to the base files so that any sub-files can be retrieved together with the base file from which the sub-file was derived.

23 Claims, 6 Drawing Sheets

| File A (Base File) 1/3/2000 17:00:00 Key: 5FF5CE 64a | File A (Base-File) 1/3/2000 15:00:00 Key 543210 64b | File A (Base-File) 1/2/2000 10:00:00 Key 2DCF 64c |
|---|---|---|
| File A (Sub-File) 1/4/2000 23:30:00 Key: 5FF5CE 66a | File A (Sub-File) 1/3/2000 16:00:00 Key 543210 66d | File A (Sub-File) 1/2/2000 12:00:00 Key 2DCF 66e |
| File A (Sub-File) 1/5/2000 10:00:00 Key: 5FF5CE 66b | | File A (Sub-File) 1/2/2000 14:00:00 Key 2DCF 66f |
| File A (Sub-File) 1/8/2000 22:00:00 Key: 5FF5CE 66c | | |

SYSTEM AND METHOD FOR RELATING FILES IN A DISTRIBUTED DATA STORAGE ENVIRONMENT

BACKGROUND OF THE INVENTION

1. The Field of the Invention

The present invention relates to systems and methods for relating files in a distributed data storage environment. More specifically, the present invention relates to systems and methods for relating groups of files transmitted to a remote storage site using an identifier unique to each group.

1. The Relevant Art

In a data processing system, a backup/restore subsystem, usually referred to as a backup subsystem, is typically used as a means to save a recent copy or version of a file, plus some number of earlier versions of the same file, on some form of backup storage devices such as magnetic disk drives, tapes, or optical storage devices. The backup subsystem is used as a means of protecting against loss of data in a given data processing system. For example, if an on-line version of a file is destroyed or corrupted because of power failure, hardware or software error, user error, or some other type of problem, the latest version of that file which is stored in a backup subsystem can be restored and therefore the risk of loss of data is minimized. Another important use of backup subsystems is that even if failures do not occur, but files or data are deleted or changed (either accidentally or intentionally), those files or data can be restored to their earlier state thus minimizing the loss of data.

A closely related concept to the backup subsystem is an archive/retrieve system, usually referred to as an archive subsystem. Archiving refers to making copies of files on lower cost storage such as tape so that the files can be deleted from more expensive technology such as disk storage. Since disk storage is frequently being updated, an archival copy also helps in preserving the state of a collection of data at a particular point in time.

Although the improved method of carrying out the backup disclosed in this application is primarily described for a backup system, it will be obvious to the person of ordinary skill in the art of data processing that the systems and methods described herein are also applicable to archive systems or other related data storage and storage management systems.

At the present time, the majority of backup systems run on host systems located in a data processing environment. Typically, a new version (also referred to as changed version) of a file is backed up based on a predetermined schedule such as, at the end of each day, or after each time that a file has been updated and saved.

Backup systems generally consume large amounts of storage media, because multiple versions of large amounts of data are being backed up on a regular basis. The transmission of the large amounts of data that prior art backup systems necessarily store also consume large amounts of network bandwidth. Therefore, those engaged in the field of data processing and especially in the field of backup/restore systems are continuously striving to find improved methods and systems to reduce the storage demand in backup systems. Previously, a full backup was conducted for each file in a system. More recently, an incremental backup method has been employed to enable the storage of and retrieval of multiple versions of a given file while consuming less storage space.

The full backup method is the most basic method used and requires the back up of an entire collection of files, or a file system, regardless of whether individual files in that collection have been updated or not. Furthermore, in the full backup method, multiple full versions of each file are maintained on a storage device. Since maintaining multiple full copies of many files consumes substantial amount of storage, compression techniques are sometimes used to reduce the amount of data stored. Compression techniques basically rely on the presence of redundancy within the file, so called intra-file redundancy, in order to achieve this reduction. The most common method is the use of a method of file compression known as Lempel-Ziv method (also known as Adaptive Dictionary Encoder or LZ coding) described in a book by T. C. Bell et. al, titled Text Compression, pp 206–235. The essence of Lempel-Ziv coding is that redundant phrases are replaced with an alias, thereby saving the storage space associated with multiple occurrences of any given phrase. This is a general method which can be applied to any file and typically results in compression ratios of the order of between 2 and 3.

Incremental backup is an alternative to full backup. In systems using incremental backup, backups are performed only for those files which have been modified since the previous incremental or full backup.

In any given backup system, the higher the backup frequency, the more accurately the backup copy will represent the present state of data within a file. Considering the large volume of data maintained and continuously generated in a typical data processing system, the amount of storage, time, and other resources associated with backing up data are very substantial. Thus, those skilled in the art are continuously engaged in searching for better alternatives and more storage and time efficient systems and methods for backing up data.

Aside from the compression technique which is heavily utilized to reduce storage requirement in a backup system, there exists a quite different method of achieving reduction in backup file size. This method is known as delta versioning or "differencing."

Differencing relies on comparisons between two versions of the same file, where multiple versions are saved as a "base file," together with some number of "sub-files" which represent only the changes to the base file. These small files, also referred to as "delta files" or "difference files," contain only the changed portions, typically bytes or blocks which have changed from the base file. Delta files are generated as a result of comparing the current version of a file with an earlier version of the same file, referred to as the base file. Differencing thus exploits redundancy between file versions, in order to achieve reductions in storage space and network traffic.

Substantial storage savings in backup systems may result from the adoption of differencing techniques, since frequently the selection of a file for incremental backup occurs after a small change has been made to that file. Therefore, since many versions of a file that differ only slightly from one another may be backed up, differencing offers great potential for substantial reductions in the amount of data that must be transferred to and stored in the backup server.

Figure 1:
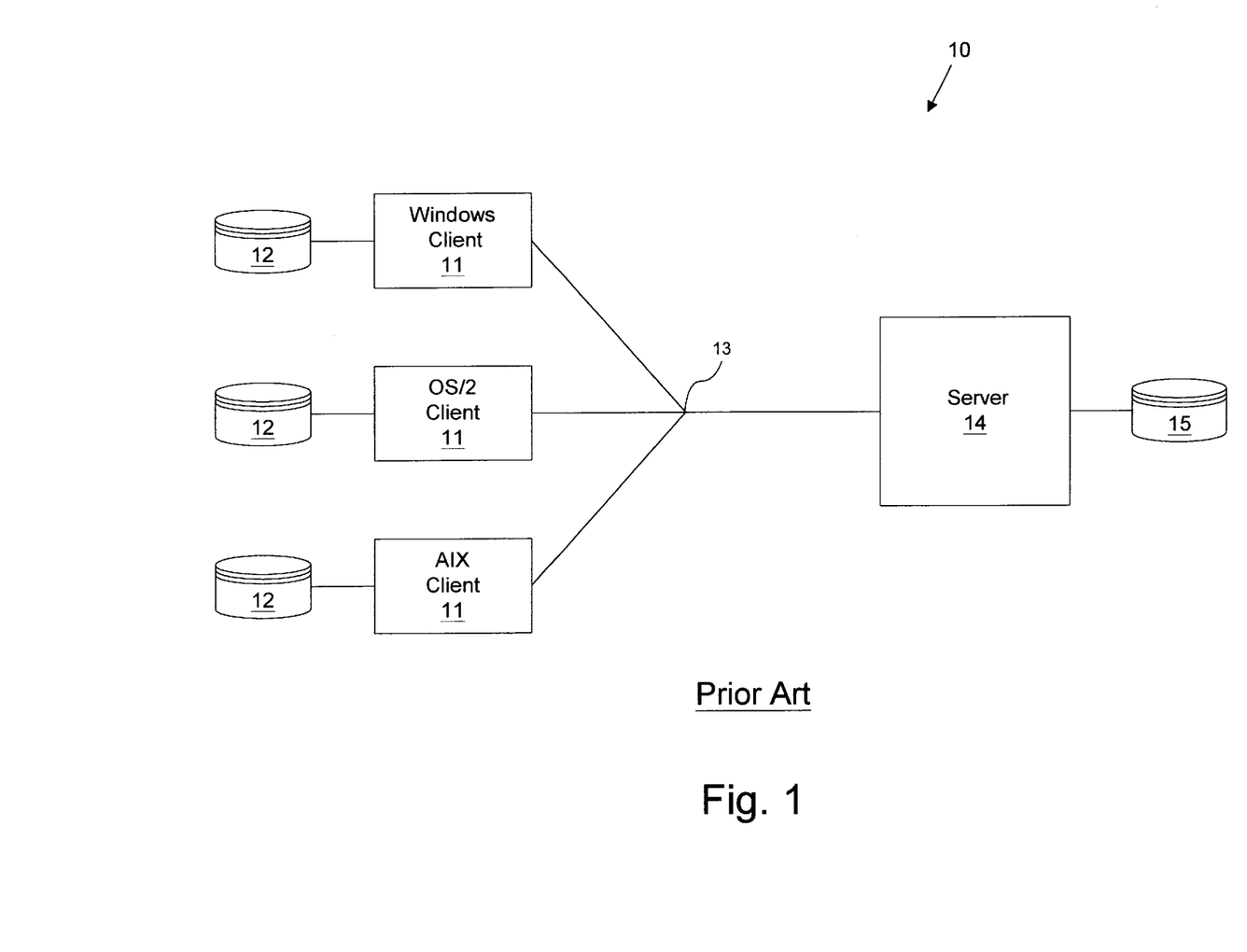
FIG. 1 is a schematic block diagram illustrating one embodiment of a typical distributed client-server system of the prior art.

Recently, the emergence of low cost local area networking, personal computer, and workstation technology has promoted a new type of data processing architecture known as the "client-server" system or environment. A client-server system 10, as shown in FIG. 1, typically consists of a plurality of client computers (also referred to as clients) 11, such as personal computers or workstations. The client computers 11 are preferably provided with a local storage medium 12 such as a disk storage device. The client computers 11 communicate over a network 13, such as an Ethernet or a Token Ring, which links the clients 11 to one or more network server computers 14.

The server computer 14 is generally a mainframe computer, a workstation, or other high end computer and is typically provided with one or more local storage mediums 15 such as a disk storage device, a tape storage device, and/or an optical storage device. The server computer 14 usually contains various programs or data which is shared by or otherwise accessible to the clients 11. Such a client-server system comnmunicating over a network is often referred to as a "distributed" system or network.

The distributed client-server environment presents a number of major issues related to data processing, integrity, and backup of such data. One major concern in the client-server environment is that a substantial amount of critical data may be located on client subsystems which lack the security, reliability or care of administration that is typically applied to server computers. A further concern is that data may accidentally be lost from a client computer, as users of such computers often do not take the time and care necessary to back up the data on a regular basis. Another concern is that backing up large amounts of data from a client can require large amounts of network bandwidth and server storage space.

Recently a number of client-server backup systems have been developed to alleviate some of the concerns listed above. An example is IBM's Tivoli Storage Manager (TSM), formerly known as ADSM (ADSTAR Distributed Storage Manager). This technology overcomes some of the deficiencies mentioned above by making backup copies of the client data on a backup server. The client copies are made automatically without user involvement and are stored on storage devices which are administered by the backup server.

A typical client-server backup system such as TSM typically operates with a client application operating in the client computer 11 and a server application operating in the server computer 14. The client application, also known as a client backup program, is activated at pre-specified or periodic times and makes contact with the server application, also referred to as a server backup program. After establishing contact and performing authentication, the client application then consults a user-configurable policy which instructs the client application regarding which sort of a backup operation should occur and which files on the client computer will be the subjects of the current backup. It then searches all or a subset of files on the client computer, determining which files should be backed up.

For example, a data file which has changed since the last backup was conducted may be selected for the backup operation. After selecting the files to be backed up, the client application transmits those files across the network to the server application. The server application then makes an entry in a listing such as a backup catalog for each file received and stores those files on storage devices attached to the backup server.

The backup system, in order to efficiently manage data storage may store data in storage devices organized in a storage hierarchy. A storage hierarchy provides a number of levels of storage devices with data storage in devices at the top levels being more expensive but having shorter access times. Moving down the hierarchy, data storage becomes less expensive, but the access times are longer. Accordingly, frequently accessed data is stored at the higher levels, while the lower levels are more suitable for long-term data storage. Among the levels of the hierarchy, data is stored in storage pools. A storage pool is a collection of storage volumes with similar geometries. Pools are collections of volumes capable of being used on a particular device. Examples of media stored in pools include tape, optical disks, magnetic disks, and other media having the same format.

The backup system also carries out several other important operations. For instance, backup copies of files that were made many months ago may be moved from disk storage to tape storage in order to reduce storage costs. Another important function of the client-server backup system occurs when the user requests the restoration of a file. The client application contacts the server application, which consults its backup catalog to establish the location of the backup copy of the file. It then returns that file across the network to the client computer which in turn makes it available to the user.

Examples of hardware which may be employed in a backup system in a distributed client-server environment include one or more server computers such as mainframes, workstations, and other high end computers and storage mediums such as the IBM 3390 magnetic storage system, IBM 3494 tape storage library or IBM 3595 optical library. Optical and tape storage libraries typically provide automated mechanical mounting and demounting of tape or optical cartridges into read/write drives. When several such devices are present, the server application is often configured to utilize the devices in a storage hierarchy in which the most likely to be accessed backup files are kept on faster access devices such as local non-volatile memory, and files less likely to be accessed are kept on less expensive, but slower access devices, such as tape or optical disks.

Despite the recent improvements made in the field of distributed client-server backup systems, certain shortcomings remain in currently available systems. Primary among these shortcomings is that the very large amounts of data on the clients now being regularly backed up tend to require large amounts of network bandwidth and to require high quantities of server storage space, which can be quite costly. Although storage management systems such as TSM may compress this data on the storage devices, the amount of data remains very large. Differencing is thought to be a solution to this problem, but differencing poses certain problems in itself For instance, in a differencing backup system, once a base file is stored in the storage devices, the base file may not be available for immediate inspection. Often, the backup server is configured with a plurality of storage devices, such as optical devices, tape backups, and non-volatile memory (such as hard disk drives) organized in the above-described storage hierarchy. Within the storage hierarchy, the particular optical disks or tapes are frequently swapped out, and the only copy of a base file may be on a disk or tape that is not currently mounted. In addition, even when the base files are immediately available on such devices, accessing the base files and scanning the devices for the base files is a relatively slow process.

Current backup systems using the differencing method of backup typically store information about the files previously backed up to the server. This information helps determine the current state of backed up files and whether these files are still available. Nevertheless, for one reason or another, the versions of the backed up files may have changed between the client and the server. For instance, either the client's record of the files or the server's version of the files may have been deleted or inadvertently altered.

Accordingly, when a sub-file is transferred to the server, a reliable method is necessary to identify or "relate" the sub-file with the base file from which it was derived in order to later be able to combine the sub-file with its base file during a restore operation. If a sub-file is not restored with the correct corresponding base file, it is not possible to correctly reconstruct the original file, and a data integrity error occurs.

Certain additional challenges in relating sub-files to base files in a distributed environment. These stem from the fact that the elapsed time between backups of the base file and a dependent sub-file could be highly variable. Additionally, the client's record of base file information could be invalid. For instance, the sub-file backup algorithm may have been disabled either on the client or on the server. Additionally, a client may back up data to multiple servers, causing the client's knowledge of the base file to be invalid relative to one or more of the different servers. Furthermore, the server database may have been regressed to an earlier point in time in the interim between storing the base file and generating a sub-file. This might occur, for instance, as a result of the database becoming corrupted and being restored from an older version. Accordingly, as discussed, the base files the server knows about may not match those which the client has tracked.

It is apparent now that implementation of an efficient backup subsystem in a computer processing environment is a formidable task and implementing such a system in a distributed client-server environment poses significant challenges. Therefore, there is a need for an improved backup system and method in a client-server environment that not only substantially reduces the storage and network bandwidth requirements of current backup systems, but also minimizes the burden in communicating the relationships between groups of files, such as base files and their sub-files, between a client and a server. The present invention addresses these deficiencies currently present in prior art client-server backup systems by providing alternative methods and systems which can be used to reduce the amount of data storage and network bandwidth required in a client-server backup system while maintaining the integrity of the system through positive identification of the relationships between groups of files transmitted between the client and server.

OBJECTS AND BRIEF SUMMARY OF THE INVENTION

The data storage management system and method of the present invention has been developed in response to the present state of the art, and in particular, in response to the problems and needs in the art that have not yet been fully solved by currently available storage management systems. Accordingly, it is an overall object of the present invention to provide a data storage management system and method that overcomes many or all of the above-discussed shortcomings in the art.

To achieve the foregoing object, and in accordance with the invention as embodied and broadly described herein in the preferred embodiment, an improved storage management system and method is provided. The data storage management system is preferably adapted to relate groups of files in a distributed data storage management system having a primary storage site such as a client computer and a remote storage site such as a server computer.

In one embodiment, the data storage management system comprises a primary storage site; a remote storage site communicating over a network with the primary storage site; a token generation module located within the primary storage site and configured to generate tokens uniquely identifying groups of files of the primary storage site; and a token listing readily available within the remote storage site and a token comparison module located within the remote storage site. The token comparison module is preferably configured to receive tokens passed together with a file from the primary storage site to the remote storage site and compare the tokens to one or more tokens within the token listing to establish a relationship of the file with other files previously transmitted from the primary storage site to the remote storage site.

The system may also comprise a plurality of base files resident within the storage devices of the remote storage site and a unique token for each of the base files stored within the token listing. A plurality of tokens may be stored within the token listing, and each of the plurality of tokens preferably uniquely identifies a base file resident within the storage devices of the remote storage site.

A backup determination module is preferably resident within the primary storage site and is preferably configured to select files for storage on the remote storage site, and determine whether the files should be stored as base files or sub-files. If the files are to be stored as sub-files, a sub-file generation module generates the sub-files by comparing the current file with a previously backed up base file. Thus, a plurality of sub-files is also preferably stored within the storage devices of the remote storage site, and each of the plurality of sub-files is preferably cross-linked with a base file resident within the storage devices.

The system also preferably comprises a repository located within the primary storage site. The repository preferably contains a representations of each of a plurality of base files stored on the remote storage site and also preferably stores a token unique to each of the base files together with the base files.

The token generation module is preferably configured to generate tokens at least partially indicative of the contents of the base files and may be configured to generate tokens comprising two components, a file identifier comprising attributes of a base file and an identification key derived from the contents of a base file.

Accompanying the data storage management system of the present invention may be a method for relating groups of files in a distributed data storage management system. In one embodiment, the method comprises a step of assigning a token to a base file of the primary storage site. The token uniquely identifies the base file and may be comprised of two components, a file identifier comprising attributes of the base file and an identification key derived from the contents of the base file.

In further steps, a copy of the base file is preferably passed from the primary storage site to the remote storage site, where the base file is preferably stored on a storage medium of the remote storage site. A copy of the token assigned to the base file is preferably passed together with the base file from the primary storage site to the remote storage site. The token is preferably stored in a token listing of the remote storage site.

A sub-file is preferably derived from the base file and the current file. A second token copied from or based upon the token of the base file is preferably associated with the sub-file and passed together with the sub-file to the remote storage site.

The remote storage site relates the sub-file to the base file by comparing the second token to the token listing and matching the token of the base file. Thereafter, a cross-linking between the sub-file and the base file is preferably generated, and the sub-file is stored in the storage hierarchy. Consequently, in response to a restore request from the primary storage site, the sub-file and the base file can be returned together to the primary storage site from the remote storage site.

BRIEF DESCRIPTION OF THE DRAWINGS

In order that the manner in which the advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 2:
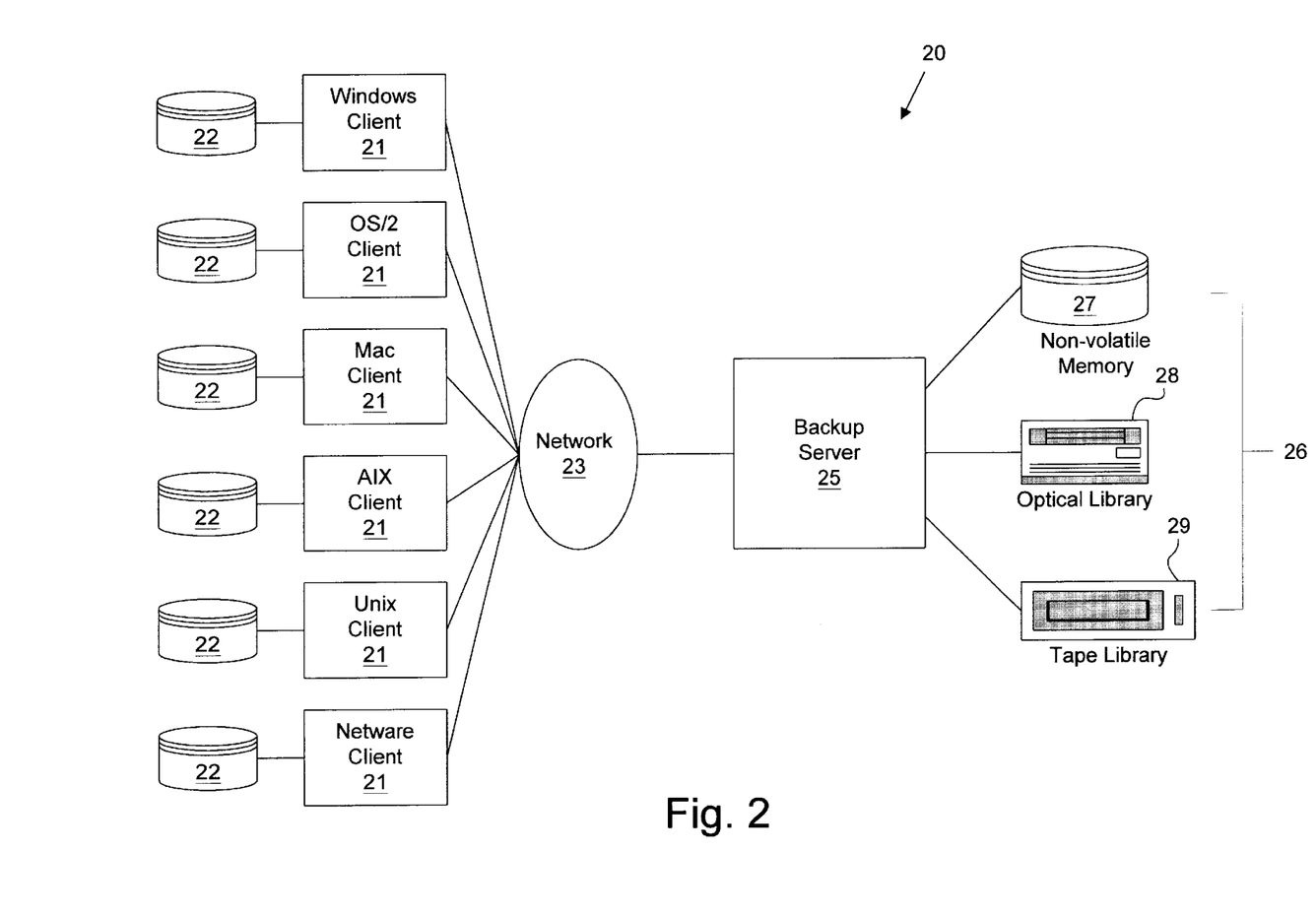
FIG. 2 is a schematic block diagram illustrating one embodiment of a distributed client-server system having a backup system suitable for implementing the present invention.

Referring now to FIG. 2, shown therein is a distributed client-server system 20 suitable for employing the data storage management system of the present invention. The system 20 typically includes a plurality of client computers 21, each with its own local storage medium 22, such as a disk storage device. The client computers (clients) 21 may typically be personal computers of the type having a system unit (not shown) which includes a CPU (processor), I/O control, and semiconductor and magnetic memories and Windows or Macintosh operating systems. The client computers 21 may further be workstations of the type having AIX, UNIX, or equivalent operating systems. These operating systems are well known to those skilled in the art of computer systems.

The client-server system 20 further includes a network 23 such as Ethernet or Token Ring which provides the communication link between the clients 21 and the backup server 25. The backup server 25 may be an IBM PC-compatible computer of the type having a system unit (not shown) which includes a CPU (processor), I/O control, and semiconductor and magnetic memories and Windows operating system. It may also be a workstation having a system unit and UNIX or AIX or equivalent operating system. It may also be a large system running the AS/400, VM or MVS operating systems. The backup server 25 is also shown provided with a storage hierarchy of attached storage mediums 26 including non-volatile memory 27 such as a disk storage device, optical library storage device 28, and/or tape library storage device 29.

In a client-server system 20 such as that shown in FIG. 2, the backup system may reside at the backup server 25 and also have a client-side program (client application) as described above. Examples of a typical backup system distributed over a client and server include IBM's Tivoli Storage Manager (TSM), the basic operation of which has been briefly described in the background section. The operation and physical implementation of personal computers, workstations, disk storage devices, optical libraries, tape libraries, and their constituents are well known to those skilled in the art of data processing and require no further description.

Figure 3:
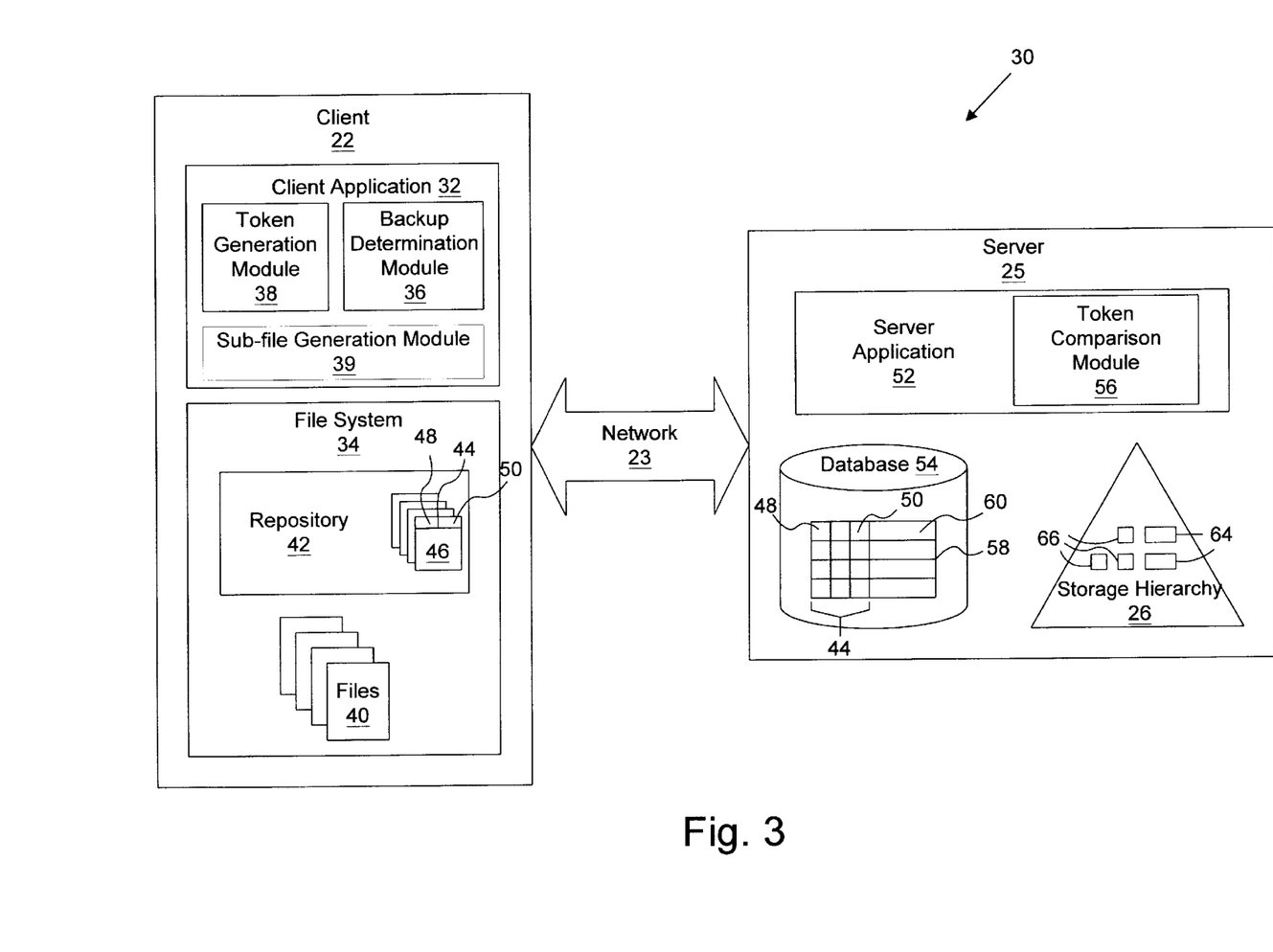
FIG. 3 is a schematic block diagram illustrating one embodiment of a system for relating groups of files in a distributed environment of the present invention.

FIG. 3 shows one embodiment of a system 30 of the present invention for relating groups of files in a distributed data storage environment. Shown within the system 30 is a primary storage site, such as a client 22 of FIG. 2, and a remote storage site, such as the backup server 25 of FIG. 2. The client 22 and the server 25 are in communication over the network 23 such as that of FIG. 2.

Within the client 22 is shown a client application 32 and a file system 34. The client application 32 is, in one embodiment, the IBM Tivoli Storage Manager (TSM) or a similar storage management program. In the depicted embodiment, the client application 32 is provided with a backup determination module 36, a token generation module 38, and a sub-file generation module 39. The file system 34 is preferably located within non-volatile memory of the client 22, and in the depicted embodiment comprises a plurality of client files 40 and a repository 42. The client files 40 may be any type of digital data, including application files, data files, data within a database, and the like.

The backup determination module 36 is preferably programmed or otherwise configured to determine which of the files 40 have not been backed up recently and to schedule those files 40 to be backed up. Those backups are preferably conducted in an incremental manner as described above and more preferably, are conducted using differencing. Accordingly, the backup determination module 36 is preferably configured to determine whether an entire backup of a file 40 must be conducted or whether only a portion of the file 40 need be backed up. When the entire file is backed up, it is stored on the server 25 as a base file 64. If a base file 64 has previously been stored for a given file 40, the backup determination module 36 may decide to store only a portion of the file 40, including one or more bytes or blocks, as a sub-file 66. The generation of the sub-file 66 is, in one embodiment, conducted by the sub-file generation module 39.

The token generation module 38 is preferably configured to generate a token 44 when the base file 64 is first transmitted to the server. Each token 44 is preferably stored within the repository 42 together with a representation 46 of the particular base file 64 which the token 44 represents. The representation 46 may be an entire copy of the base file 64 if the base file 64 is small, or may be a compressed version of the base file 64 if the base file 64 is large. The token is, in one embodiment, generated with two components, attributes (or metadata) 48 of the base file 64 and a key 50 uniquely identifying the base file 64.

In one embodiment, the key 50 is at least partially representative of the contents of the base file 64 and may be derived from the contents of the base file 64. For instance, the key 50 may be a time stamp or a compressed version of the base file 64, such as a digital signature. Preferred manners of generating digital signatures include hashing, Cyclical Redundancy Check (CRC) encoding, and checksum generation.

Shown provided within the server 25 are a backup server application 52, a database 54, a token comparison module 56, and the storage hierarchy 26 of FIG. 2. The server application 52 is preferably the counterpart to the client application 32, and as such, may be part of a storage management system such as IBM's TSM. The server application 52 is preferably programmed or otherwise configured to receive the base files 64 transmitted from the client 22 and store the base files 64 within the storage hierarchy 26. In so doing, the base files 64 may become unavailable or impractical to access for comparison when sub-files 66 derived from or otherwise related to (grouped with) the base files 64 are received. Accordingly, in order to establish membership in a common group, including the relation of a sub-file 66 to a parent base file 64, the tokens of the base files are stored within a token listing. In the depicted embodiment, the token listing is a table 58 of the database 54.

The database table 58 is provided with a series of fields, one of which contains the tokens 44 therein. The attributes 48 and key 50 of each token 44 may be stored in fields, and additional fields 60 may be included indicating the location of the base file 64 within the storage hierarchy 26. In addition, the database table 58 is preferably also used to store information about the sub-files 66 in order to provide the capability of locating the sub-files and matching the sub-files 66 to the base files 64. This information may include the location of each sub-file 66 within the storage hierarchy 26 as well as an identification code or pointer cross-linking the sub-files 66 to their respective base files 64.

The token comparison module 56 compares the tokens of each sub-file received in the server 25 against the tokens 44 within the database table 58. A match between a token transmitted with a sub-file 66 and a token of the table 58 representing a base file 64 establishes the membership of the particular sub-file 66 in the group of which the base file 64 is the primary member. In one embodiment, the group comprises the base file 64 from which the sub-file 66 was derived as well as any other sub-files derived from the base file 64. Once membership is established, the sub-file 66 may be cross-linked to the base file 64 in order to track the files when stored within the storage hierarchy 26 and for later retrieval of members of the group.

For instance, it may be desired to restore a file 40 of the client 32 to a particular point in time. The attributes 48 may be used to establish and locate the particular version of the file that was current for the desired time, whether a base file 64 or a sub-file 66. If the version is a sub-file 66, the sub-file 66 is accessed, and the cross-linking is utilized to locate the base file 64. The two files 64, 66 are then returned together to the client application 32, which uses the sub-file 66 and the base file 64 to restore the desired version of the file 40. If the version is a base file 64, the base file 64 is returned.

Figure 4:
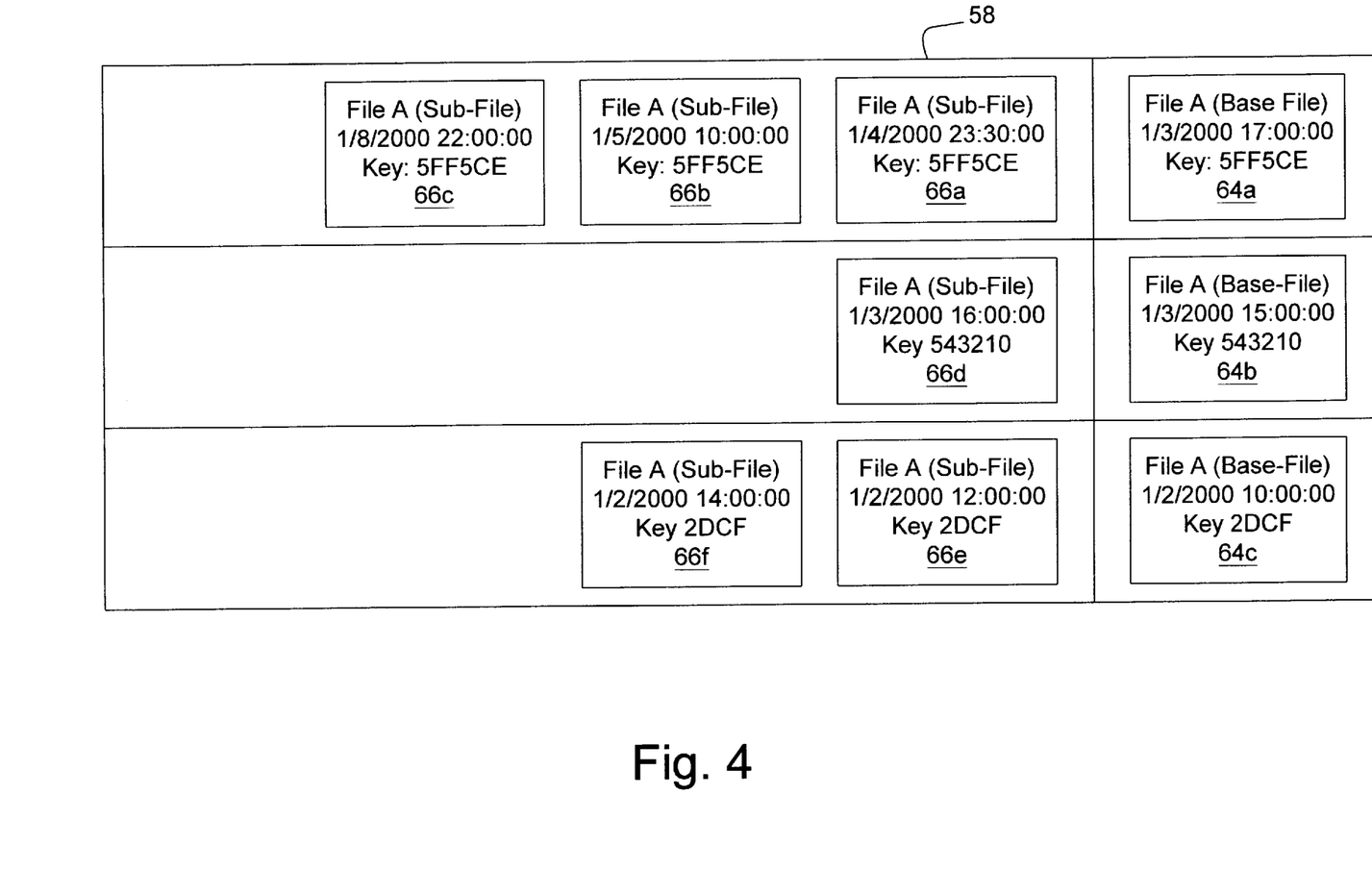
FIG. 4 is a schematic block diagram illustrating one embodiment of a group listing of grouped files under the present invention.

FIG. 4 depicts a portion of a database table 58 listing. Listed therein are groups of files consisting of base files 64 and sub-files 66. Each of the base files 64 and the sub-files 66 corresponds to a separate backup of a common file 40 of FIG. 3. The first listed backup occurs as base file 64c and occurred at 10:00 on Jan. 2, 2000. The second listed backup transpired after relatively slight changes and is backed up as a sub-file 66e, occurring at 12:00 on Jan. 2, 2000. The third backup was also a relatively slight change and accordingly was backed up as a sub-file 66f at 14:00 on Jan. 2, 2000.

"Thereafter, significant changes to the file 40 were made, and accordingly, the file 40 was backed up as a base file 64b at 15:00 on Jan. 3, 2000. The next backup was made as a sub-file 66d at 16:00 on Jan. 3, 2000. Thereafter, once again, significant changes were made, and the file 40 was backed up as a base file 64a, after which backups were made as sub-files 66a, 66b, and 66c."

As depicted in FIG. 4, the attributes may not uniquely identify each base file 64, or relate the sub-files 66 of a base file 64 to the base file 66. Accordingly, the tokens 44, and particularly, the keys 50 are shown uniquely identifying each base file 64 and enabling reliable association of the groups of base files 64 and sub-files 66 at the server 25. A token (key) corresponding to the base file from which a particular sub-file 66 was derived is also shown associated with each sub-file 66 in order for the token comparison module to relate and group the sub-files 66 with the base files 64 when received and then cross-link the groups of base files 64 and sub-files 66.

The base files 64 and sub-files 66 may not be associated together in the storage hierarchy 26 as they are received at different times, and indeed, may be stored on different storage devices, disks, tapes, recordings, etc.

Figure 5:
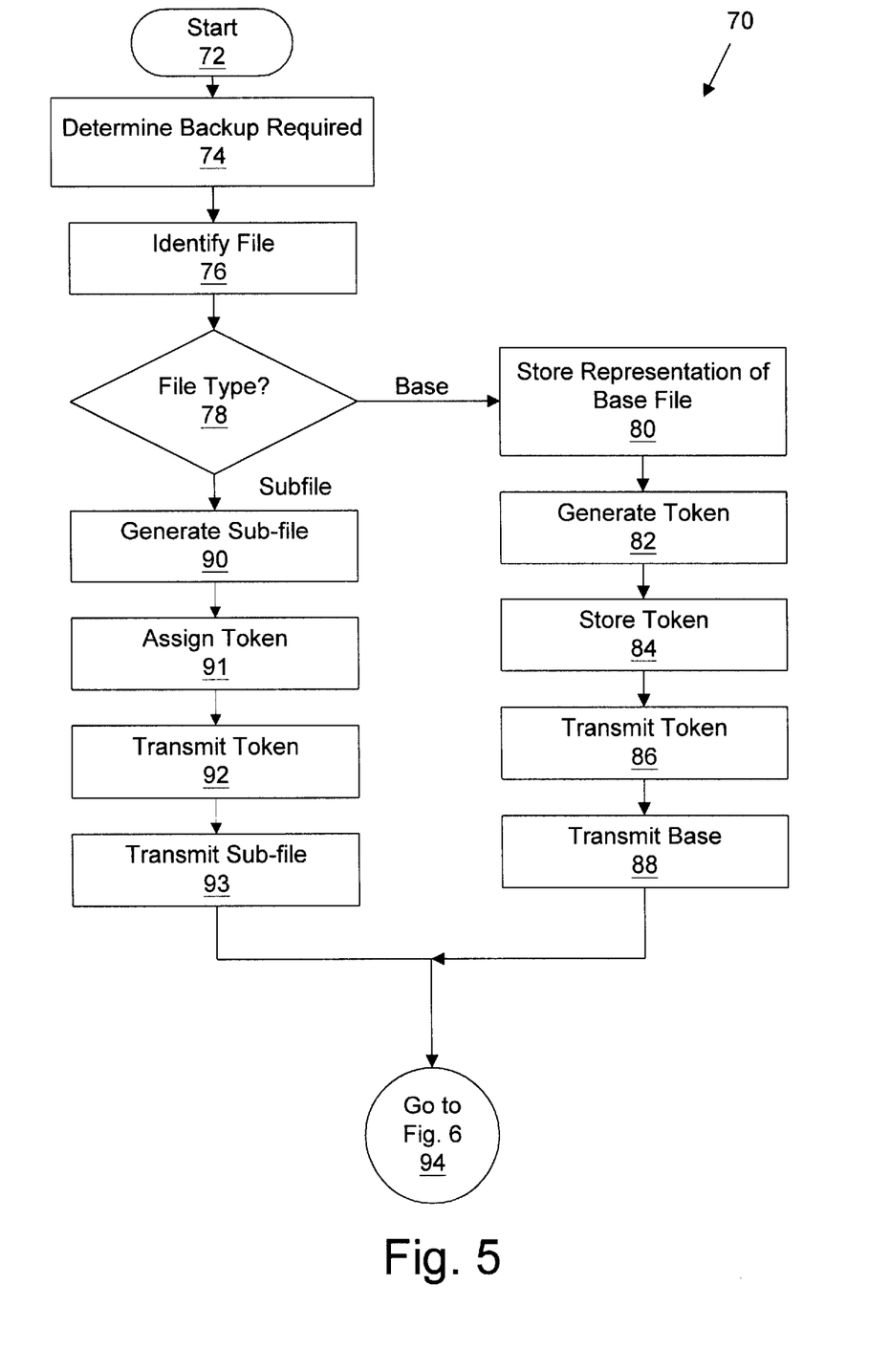
FIG. 5 is a schematic flow chart diagram illustrating one embodiment of a client-side method of the present invention for relating groups of files in a distributed data management system.

FIG. 5 is a schematic flow chart diagram illustrating one embodiment of a client portion of a method 70 of relating groups of files in a distributed environment. The method 70 is preferably implemented with the system 30 of FIG. 3. The method 70 starts at a step 72 and proceeds to a step 74 in which the backup determination module 36 of FIG. 3 determines whether a backup of one or more of the files 40 needs to be conducted. This determination may utilize the policy discussed above, and may be based on time, on storage space constraints, upon notification of a change to a file 40, or may be initiated manually by a user.

At a step 76, the file or files 40 to be backed up are identified. At a decision step 78, the method 70 determines whether the file 40 to be backed up will be backed up as a base file 64 or as a sub-file 66. This determination may hinge on whether the file 40 has been backed up before, on how much of the file 40 has changed since the last backup, and/or whether a current representation of the base file 64 exists within the repository 42. For instance, if the file 40 has never been backed up, it is preferably initially backed up as a base file 64. If a base file 64 backing up the file 40 has already been saved to the backup server 25 and the changes are not extensive, the particular bits or blocks of data affected by the changes may be backed up as a sub-file 66. If entries for a base file 64 already exist in the repository 42 and the changes are extensive, the backup evaluation module may choose to backup the entire file as a base file 64, possibly overwriting entries in the repository 42 for the previous base file 64 corresponding to the file 40.

If the file 40 is to be backed up as a base file 64 at the current time, the method 70 proceeds to a step 80. At the step 80, a representation 46 of the base file 64 is stored within the repository 42. The representation 46, as discussed above, may be a copy of the base file 64 (which is likewise a copy of the file 40) or may be a compressed version of the base file 64. The representation 46 is used later by the backup determination module 36 to determine which changes have been made between the current file 40 and the previously backed up base file 64, as indicated by the representation 46 in the repository 42. At a step 82, a token 44 is generated for the base file 64. As discussed, the token preferably uniquely identifies the base file 64 and may be a digital signature or other representation of the contents of the base file 64.

At a step 84, the token 44 is stored within the repository 42 and is preferably linked with the representation 46 of the base file 64. At a step 86, the token 44 is transmitted to the server 25. At a step 88, the base file 64 is transmitted to the server 25, preferably in the same transaction as the transmission of the token 44 of step 86. The method 70 then progresses to a step 94, where the client-side portion of the method 70 ends. The method 70 then progresses to the node 102 of FIG. 6.

Regressing back to the decision step 78, if the file 40 is to be backed up as a sub-file 66, the method 70 progresses to a step 90 where the sub-file 44 is generated. As mentioned, this preferably comprises the sub-file generation module 39 of FIG. 3 comparing the current version of the file 40 to be backed up to its last backed up state, as determined by the representation 46, and placing the changed portions into the sub-file 66.

At a step 91, the token 44 of the base file 64 from which the sub-file 66 was derived, or a derivation or representation of that token is assigned to the sub-file 66. The token 44 is then transmitted to the server 25 at a step 92, preferably substantially together with the transmission of the sub-file 66 as indicated by a step 93. It is preferred that the sub-file 66 and the token 44 be transmitted together within a single transaction such that the association between the sub-file 66 and the token 44 is not lost. The method 70 then progresses to the step 94 where the client-side portion of the method 70 ends.

Figure 6:
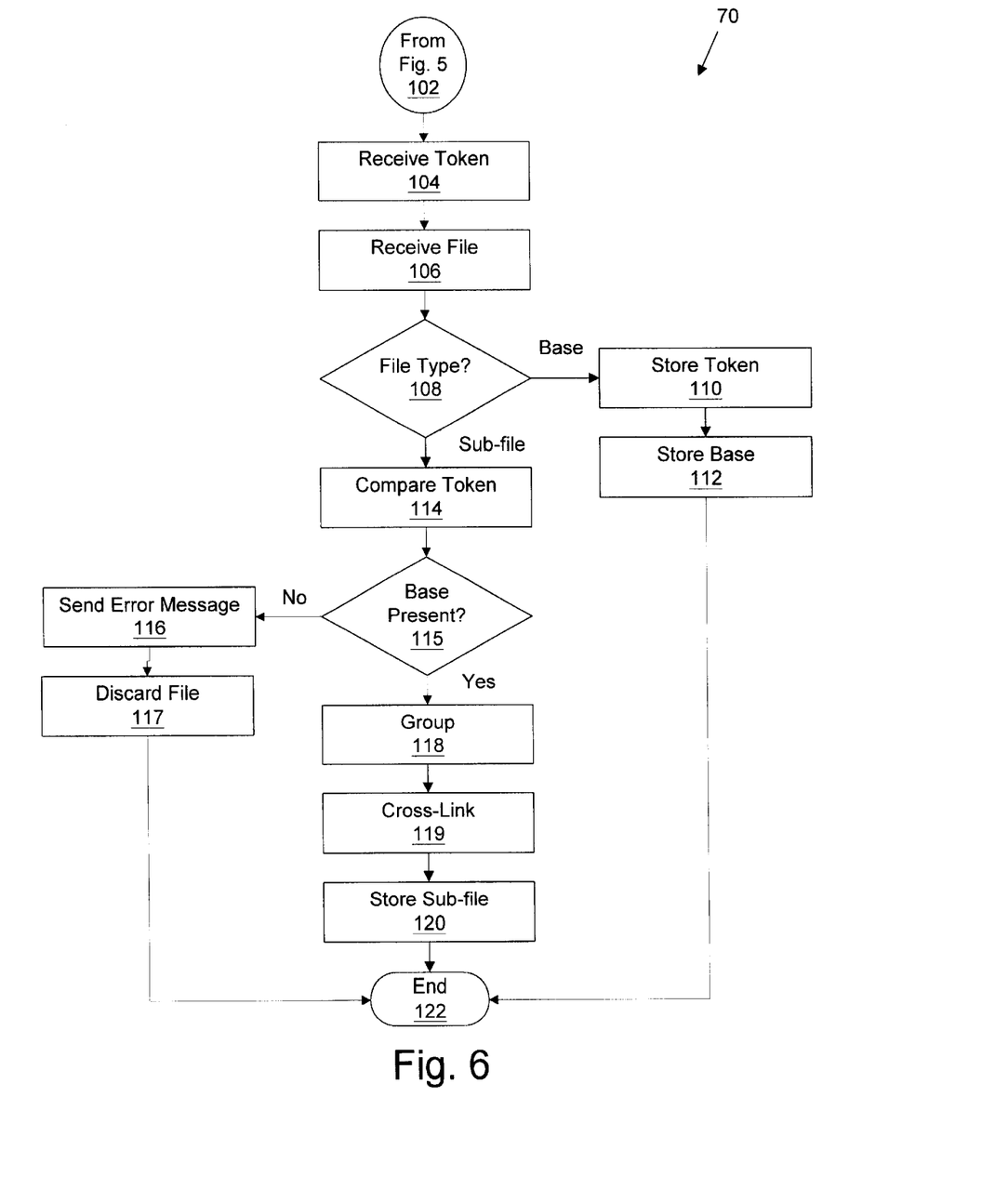
FIG. 6 is a schematic flow chart diagram illustrating one embodiment of a server-side method of the present invention for relating groups of files in a distributed data management system.

FIG. 6 is a schematic block diagram illustrating one embodiment of a server-side portion of the method 70 for relating groups of files in a distributed environment of the present invention. The server-side portion of the method 70 starts at a step 102 and progresses to a step 104. At the step 104, the token 44 transmitted at either step 86 or step 92 of FIG. 5 is received by the server 25. Preferably, the token 44 is received into the server application 52 for examinnation of the token 44.

At a step 106, the server 25 receives the file, transmitted at step 88 or 93, that is associated with the token 44. The file is preferably either a base file 64 or a sub-file 66, but may be any file associated with a group of files. Preferably, the file is transmitted over the network 23 from the client 22 to the server 25, and as discussed, is preferably transmitted in the same transaction as the token 44. At a decision step 108, the server application 52 determines whether the file is a base file 64 or a sub-file 66. Preferably, a portion of the attributes 48 of the token 44 lists the nature of the file, whether it is a base file 64 or a sub-file 66.

If the file is determined to be a base file 64, the method 100 progresses to a step 110 where the token 44 transmitted with the base file 64 and generated at the step 82 of FIG. 5 is stored within the token listing. As discussed, the token listing is preferably a table 58 of the database 54. Preferably, the location to which the base file 64 is to be stored is also stored within the database 54 together with the token 44 containing the attributes 48 and the unique key 50.

At a step 112, the base file 64 is stored within the storage hierarchy 26 of FIG. 3. As previously noted, the base file 64 may be stored in a storage device connected to the server 25, such that the base file 112 is not readily available for comparison when sub-files 66 derived from the base file 64 are subsequently transmitted. Accordingly, when such sub-files are transmitted, as determined by the decision step 108, the method 100 progresses to a step 114 where the token 44 accompanying the transmitted file is compared to the tokens 44 within the token listing (the database table 58). Comparing the tokens 44 eliminates the need to have the base file 64 readily available and the unique identification key 50 of the token 44 allows for reliable identification of the base file 64 to which the sub-file corresponds.

As indicated by a decision step 115, the token comparison module 56 determines whether a base file 64 with a token 44 corresponding to the token 44 of the transmitted sub-file 66 file is listed within the table 58. If a corresponding base file 64 is not present, the method 70 progresses to a step 116. At the step 116, an error message is sent back to the client 22. The error message is a signal to the client application 32 in one embodiment that the file 40 being backed up should be backed up as a base file 64 rather than as sub-file 66, because no corresponding base-file 64 can be located. The method 70 then progresses to a step 17 where the received file is discarded and the server-side method then awaits the client 22 to transmit a backup of the original file 40 as a base file 64. The client 22 then preferably retransmits the backup of the file 40 as a base file, returning the method 70 to step 80 of FIG. 5.

When the token comparison module 56 does locate a corresponding base file 64 at the decision step 115, the method 70 proceeds to a step I18. At the step 18, the token comparison establishes a group to which the sub-file 66 belongs. In the depicted embodiment, the group corresponds to the base file 64 and any related sub-files 66 that are also members of the group. At a step 19, the sub-file 66 is cross-linked to the base file 64. This preferably corresponds to listings within the table 58 of the locations of the base file 64 and the sub-file and an association of the base file 64 and the sub-file 66 such that the two can be accessed together when requested by the client 22.

At a step 120, the sub-file 66 is stored within the storage hierarchy 26. Preferably, as discussed, the storage location of the sub-file is correspondingly stored within the database 54. At a step 122, the method 100 ends.

While the system and method of the present invention have been described with respect to one example where the groups of files to be related comprise base files and sub-files in a data storage management system, one skilled in the art will readily recognize that the invention has broader application and is also useful for relating other types of groups of files shared between a first storage site and a second storage site. The present invention is considered to cover this broad range of usage.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for relating groups of files in a distributed data storage system having a primary storage site and a remote storage site, the method comprising:

assigning a token to a file of the primary storage site;

passing a copy of the file from the primary storage site to the remote storage site;

passing a copy of the token from the primary storage site to the remote storage site;

assigning membership of the file to at least one of a plurality of groups of files residing on the remote storage site by comparing the token with other tokens on the remote storage site without retrieving the group of files corresponding thereto; and in response to a request from the primary storage site, returning a sub-file and a corresponding base file to the primary storage site from the remote storage site, the relationship of the base file and the sub-file established with use of the token.

2. The method of claim 1, wherein the token uniquely identifies a base file.

3. The method of claim 2, wherein the token is comprised of two components, a file identifier comprising attributes of the base file and an identification key derived from the contents of the base file.

4. The method of claim 1, wherein the file comprises a sub-file derived from a base file, the token is at least partially derived from the base file, and wherein the base file is not immediately available for comparison to the sub-file to determine relation of the sub-file to the base file.

5. The method of claim 1, wherein the file is a base file and the token is generated from the contents of the base file.

6. The method of claim 5, further comprising deriving a sub-file from the base file, assigning a second token based upon the token of the base file to the sub-file, and passing the sub-file together with the second token to the remote storage site.

7. The method of claim 1, wherein the file is a sub-file derived from a base file and the token is derived from the contents of the base file.

8. The method of claim 1, wherein determining membership comprises comparing the token to a listing of tokens, each token uniquely identifying a base file stored within the remote storage site.

9. The method of claim 1, wherein the plurality of groups comprise a plurality of base files grouped together with sub-files of each base file.

10. The method of claim 1, further comprising creating a cross-linking between a sub-file and a base file that have been related as a result of the step of determining membership of the file within one of a plurality of groups.

11. The method of claim 1, further comprising determining by comparison of tokens at the remote storage site that a file transmitted to the remote storage site as a sub-file does not have a corresponding base file at the remote storage site and returning a message to the primary storage site to notify the primary storage site that the sub-file will not be stored by the remote storage site.

12. The method of claim 11, further comprising, in response to the receipt of the message, retransmitting a backup of a file of the primary storage site as a base file rather than as a sub-file.

13. A method for relating groups of files in a distributed data storage system having a primary storage site and a remote storage site, the method comprising:

assigning a token to a base file of the primary storage site, the token uniquely identifying the base file and comprised of two components, a file identifier comprising attributes of the base file and an identification key derived from the contents of the base file;

passing a copy of the base file from the primary storage site to the remote storage site;

transferring the base file to a storage medium attached to the remote storage site;

passing a copy of the token from the primary storage site to the remote storage site;

storing the token in a token listing of the remote storage site;

deriving a sub-file from the base file, assigning a second token based upon the token of the base file to the sub-file, and passing the sub-file together with the second token to the remote storage site;

determining at the remote storage site the relation of the sub-file to the base file by comparing the second token to the token listing and matching the token of the base file;

creating a cross-linking between the sub-file and the base file; and in response to a request from the primary storage site, returning the sub-file and the base file substantially together to the primary storage site from the remote storage site.

14. A system for relating groups of files in a distributed data storage system having a primary storage site and a remote storage site, the system comprising:

a token generation module within the primary storage site, the token generation module configured to generate tokens uniquely identifying files transmitted from the primary storage site to the remote storage site;

a token listing within the remote storage site;

a token comparison module within the remote storage site, the token comparison module configured to receive tokens passed in conjunction with transmission of a file from the primary storage site to the remote storage site and compare the tokens to one or more tokens within the token listing to establish a relationship of the file with other files previously transmitted from the primary storage site to the remote storage site without retrieving the other files; and more storage devices of the remote storage site, each of the plurality of sub-files cross-linked with a base file resident within the storage devices after grouping the sub-files with the base files with use of the token comparison module.

15. The system of claim 14, further comprising a plurality of base files resident within storage devices of the remote storage site, a unique token corresponding to each of the base files stored within the token listing.

16. The system of claim 14, further comprising a plurality of tokens stored within the token listing, each of the plurality of tokens uniquely identifying a base file resident within a storage device of the remote storage site.

17. The system of claim 14, further comprising a backup determination module resident within the primary storage site, the backup determination module configured to select files for storage on the remote storage site and determine whether the files should be stored as base files or sub-files.

18. The system of claim 14, further comprising a repository within the primary storage site, the repository containing a representation of each of a plurality of base files stored on the remote storage site and also containing a plurality of tokens, each token unique to one of the base files stored on the remote storage site.

19. The system of claim 14, wherein the token generation module is configured to generate tokens at least partially indicative of the contents of base files.

20. The system of claim 19, wherein the token generation module is configured to generate tokens comprising two components, a file identifier comprising attributes of a base file and an identification key derived from the contents of a base file.

21. The system of claim 14, further comprising a hierarchy of storage devices connected to the remote storage site, a plurality of base files stored within the storage hierarchy, and a plurality of tokens stored within the token listing, each of the plurality of tokens uniquely identifying one of the base files stored within the storage hierarchy.

22. The system of claim 14, wherein the token comparison module is further configured to note a lack of establishment of a relationship of the file with other files previously transmitted from the primary storage site to the remote storage site and in response initiate the transmission of a message to the primary storage site that the file will not be stored at the remote storage site.

23. The system of claim 22, wherein the primary storage site is configured, in response to the receipt of the message, to retransmit a backup of a file of the primary storage site as a base file rather than as a sub-file.

* * * * *

UNITED STATES PATENT AND TRADEMARK OFFICE
CERTIFICATE OF CORRECTION

PATENT NO.    : 6,615,225 B1
DATED         : September 2, 2003
INVENTOR(S)   : Cannon et al.

It is certified that error appears in the above-identified patent and that said Letters Patent is hereby corrected as shown below:

Column 3,
Line 14, "comnmunicating" should read -- communicating --.

Column 4,
Line 32, "in.which" should read -- in which --.
Line 48, "itself" should read -- itself. --.

Column 5,
Line 11, "challenges in" should read -- challenges exist in --.

Column 6,
Line 36, "representations" should read -- representation --.

Column 10,
Lines 8 and 14, remove, " "

Column 11,
Line 58, "100 progresses" should read -- 70 progresses --.

Column 12,
Line 1, "file 112" should read -- file 64 --.
Line 5, "method 100" should read -- method 70 --.
Line 22, "step 17" should read -- step 117 --.
Line 30, "step 18," should read -- step 118, --.
Line 34, "step 19," should read -- step 119, --.

UNITED STATES PATENT AND TRADEMARK OFFICE
CERTIFICATE OF CORRECTION

PATENT NO. : 6,615,225 B1
DATED : September 2, 2003
INVENTOR(S) : Cannon et al.

It is certified that error appears in the above-identified patent and that said Letters Patent is hereby corrected as shown below:

Column 14,
Line 36, "and more" should read -- and a plurality of sub-files within one or more --.

Signed and Sealed this

Fourth Day of May, 2004

JON W. DUDAS
*Acting Director of the United States Patent and Trademark Office*